(12) United States Patent
Bradley

(10) Patent No.: US 11,133,661 B2
(45) Date of Patent: Sep. 28, 2021

(54) TRAFFIC SIGNAL POSITION DETECTION SYSTEM

(71) Applicant: Scott Bradley, San Dimas, CA (US)

(72) Inventor: Scott Bradley, San Dimas, CA (US)

( * ) Notice: Subject to any disclaimer, the term of this patent is extended or adjusted under 35 U.S.C. 154(b) by 83 days.

(21) Appl. No.: 16/717,607

(22) Filed: Dec. 17, 2019

(65) Prior Publication Data
US 2020/0194990 A1    Jun. 18, 2020

Related U.S. Application Data

(60) Provisional application No. 62/780,919, filed on Dec. 17, 2018.

(51) Int. Cl.
*H02H 1/00* (2006.01)
*G08G 1/095* (2006.01)
*G08G 1/07* (2006.01)

(52) U.S. Cl.
CPC ............. *H02H 1/0023* (2013.01); *G08G 1/07* (2013.01); *G08G 1/095* (2013.01)

(58) Field of Classification Search
CPC .......... G08G 1/07; G08G 1/095; G08G 1/097; H02H 1/0023
See application file for complete search history.

(56) References Cited

U.S. PATENT DOCUMENTS

| | | | | |
|---|---|---|---|---|
| 3,629,802 A | * | 12/1971 | Clark | G08G 1/097 340/931 |
| 3,778,762 A | * | 12/1973 | Jarko | G08G 1/097 340/931 |
| 3,902,156 A | * | 8/1975 | Hill | G08G 1/097 340/931 |
| 6,426,704 B1 | * | 7/2002 | Hutchison | F21S 8/00 340/693.5 |
| 2008/0158354 A1 | * | 7/2008 | Hutchison | G08G 1/095 348/143 |

* cited by examiner

*Primary Examiner* — Sisay Yacob
(74) *Attorney, Agent, or Firm* — Law Office of Glenn Smith; Glenn R. Smith; Lisa L. Smith

(57) ABSTRACT

Traffic signals can become skewed due to car crashes, severe winds, vandalism, earthquakes and other man-made or natural phenomena. Severe skewing is termed a "conflict." An advantageous position detection mechanism is configured to mount inside a traffic light signal head. If signal head movement is outside of predefined limits, an electrical signal is generated indicating a conflict, i.e. traffic signal skewing so severe that drivers and pedestrians are endangered. Normal operation of the intersection is terminated and automatic communications to an appropriate command and control facility are made. For example, a conflict may cause the traffic signal to generate a flashing red light until the traffic signal is repaired.

6 Claims, 13 Drawing Sheets

TRAFFIC SIGNAL POSITION DETECTION SYSTEM

PRIORITY CLAIM TO RELATED PROVISIONAL APPLICATIONS

The present application claims priority benefit under 35 U.S.C. § 119(e) to U.S. Provisional Patent Application Ser. No. 62/780,919 filed Dec. 17, 2018 titled Traffic Signal Position Detection System. The above-cited provisional patent application is hereby incorporated in its entirety by reference herein.

BACKGROUND OF THE INVENTION

Traffic lights coordinate the safe and smooth movement of motor vehicles and pedestrians through road intersections. This is accomplished by a variety of control systems ranging from simple mechanical clockwork mechanisms to sophisticated computer-controlled systems that detect and adapt to a variety of automobile and pedestrian traffic conditions.

SUMMARY OF THE INVENTION

Traffic and pedestrian control signals are frequently hit by cars or otherwise perturbed by strong forces, such as earthquakes and high winds, that force the signal lights out of alignment. Such perturbations create a dangerous condition known as a conflict. A conflict example is northbound traffic having a red light, but because a westbound light is turned out of position, it is displaying a green light to northbound traffic. This creates a danger to drivers or pedestrians unaware of the signal light malfunction.

A traffic signal position detection system automatically senses signal light conflicts so as to trigger conflict management, which may include automatic calls to appropriate command and control facilities indicating that the intersection has a conflict. Conflict management may also include termination of normal traffic signals and initiation of warnings, such as flashing red traffic signals to all cars approaching the intersection. Specifically, in various embodiments, a traffic signal position detection system has a traffic signal mount at least partially disposed within a signal head. A first sensor portion is fixedly attached to the traffic signal mount, which is unmovable. A second sensor portion is fixedly attached to the signal head, which may rotate out-of-position due to various conditions described above. The first sensor portion and the second sensor portion interact so as to indicate a traffic signal conflict. Specifically, relative movement of the first sensor portion and the second sensor portion alters an electrical signal in the first sensor portion that is transmitted to a control cabinet (not shown). The control cabinet houses all of the command and control functions for the intersection and maintains communications with a central hub or DOT (Department of Transportation) control facility.

In various embodiments, relative movement of the first sensor portion and the second sensor portion ends an electrical signal from at least one of the sensor portions. In a first embodiment, a combination reed switch and magnet allow current to flow to the control cabinet if and only if there is no traffic signal conflict. In a second embodiment, a combination plug and conductive link allow current to flow to a control cabinet if and only if there is no traffic signal conflict. In a third embodiment, a combination fixed block and normally-open switch allow current to flow to a control cabinet if and only if there is no traffic signal conflict. In a fourth embodiment, a combination optical sensor disposed over an alternating pattern of black and white squares generates an alternating on/off signal during movement of a signal head during a conflict occurrence. The above-cited embodiments are described in detail with respect to FIGS. 6-9.

DETAILED DESCRIPTION OF THE PREFERRED EMBODIMENTS

Figure 1A:
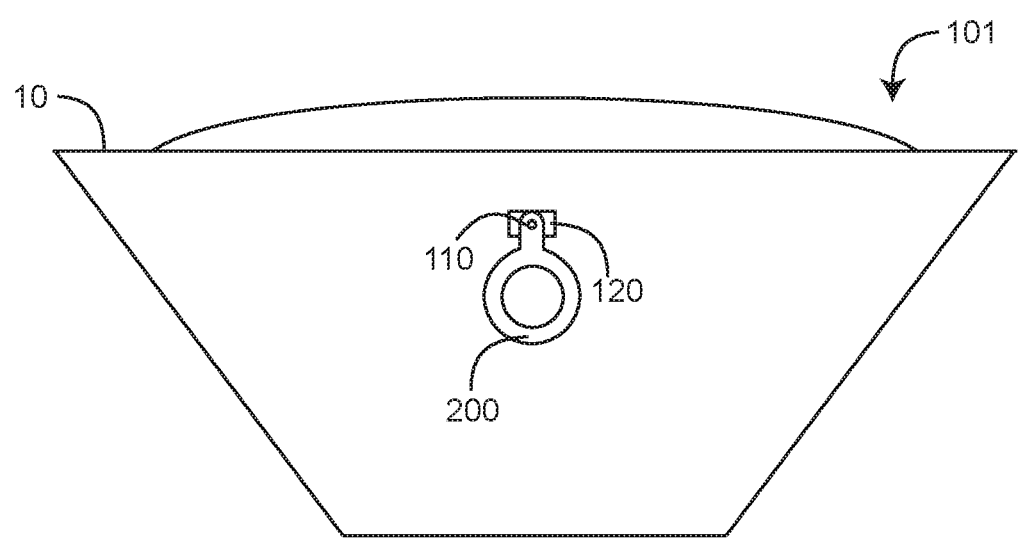
FIGS. 1A-B are generalized top, partially-transparent views of a signal head and a conflict sensor assembly in un-skewed and skewed positions, respectively.
Figure 1B:
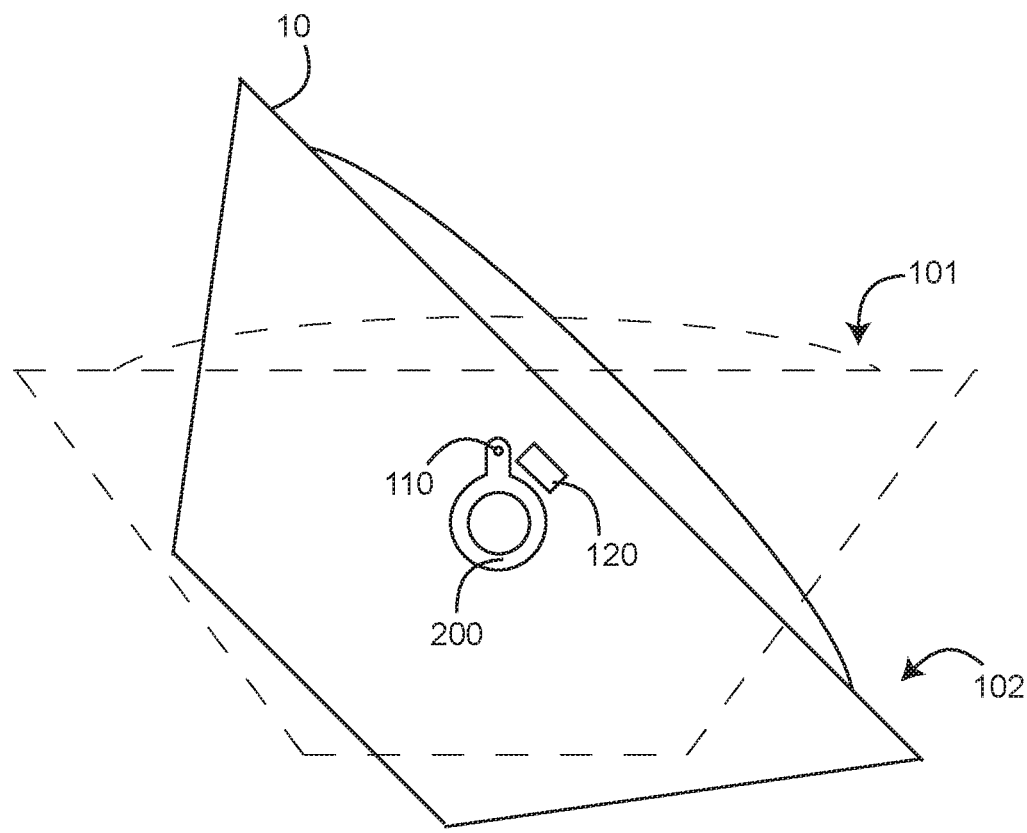

FIGS. 1A-B generally illustrate a traffic signal position detection system having a signal head 10 shown in a normal, un-skewed position 101 (FIG. 1A) and in a skewed position 102 (FIG. 1B). In particular, the signal head 10 is movable and rotates around the mount assembly 200. The traffic signal sensor assembly includes fixed sensor 110 and a movable sensor 120. In particular, the fixed sensor 110 is attached to the mount assembly 200, and the movable sensor 120 is attached to the signal head 10.

Figure 2:
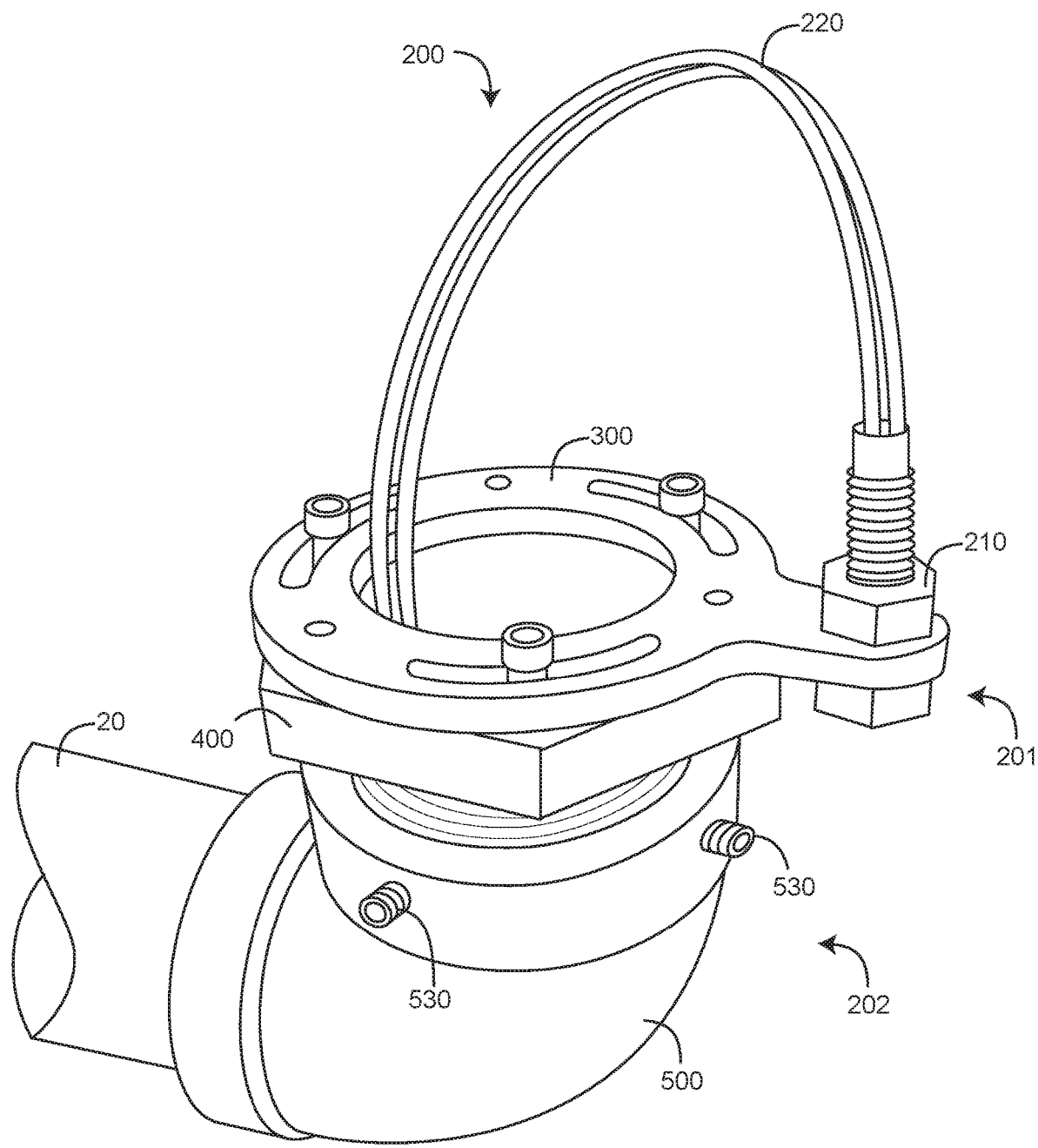
FIG. 2 is a perspective side view of a signal head mounting assembly.
Figure 3:
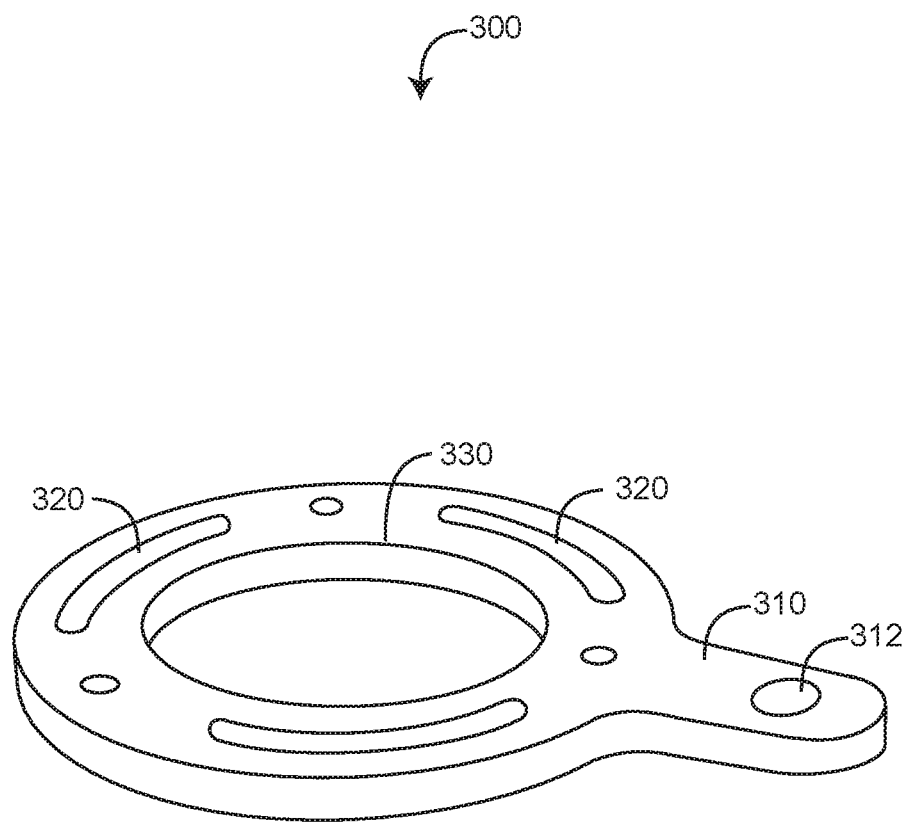
FIG. 3 is a perspective side view of a mounting plate.
Figure 4:
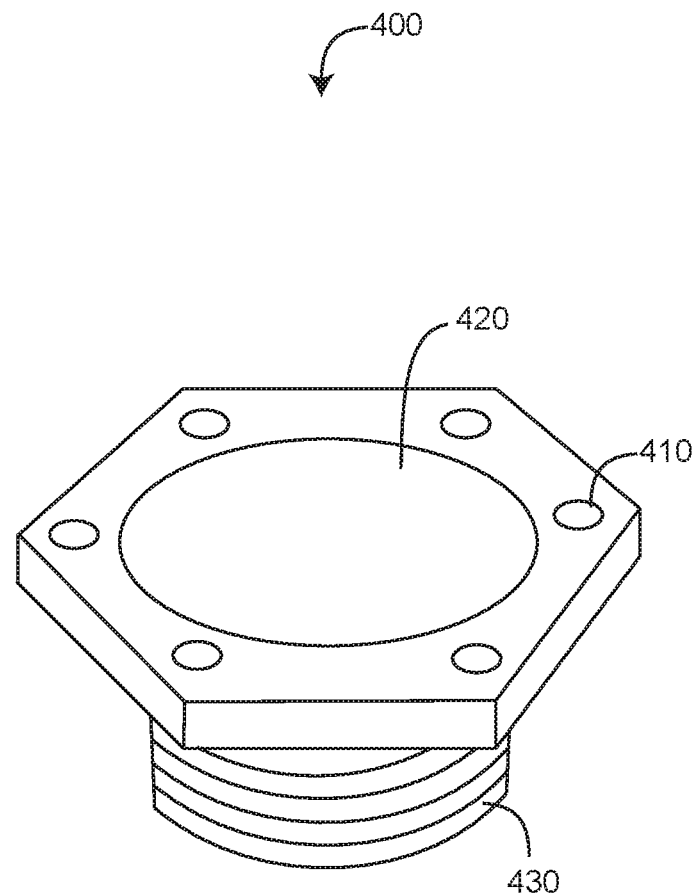
FIG. 4 is a perspective side view of a mounting nut.
Figure 5:
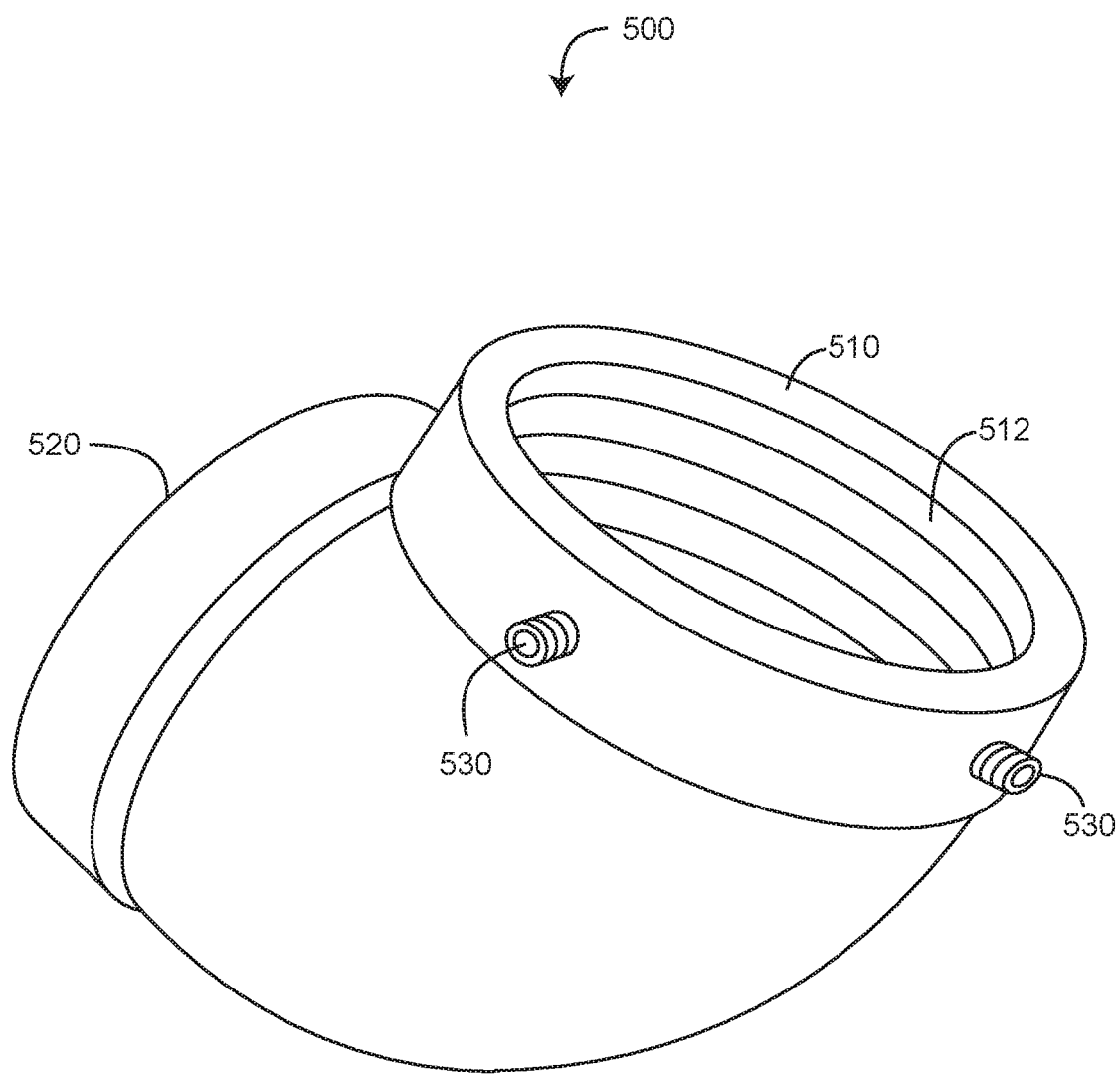
FIG. 5 is a perspective side view of an elbow.

FIGS. 2-5 illustrate details of the mount assembly 200. FIG. 2 illustrates a traffic signal detection assembly 200, which includes a sensor assembly 201 and a signal-head mounting assembly 202. The sensor assembly 200 has a mounting plate 300, a sensor 210 disposed on the mounting plate 300 and sensor leads 220 extending from the sensor 210.

As shown in FIG. 2-5, the signal-head mounting assembly 202 includes a mounting nut 400 and a mounting elbow 500 providing a wire conduit. The signal-head 10 (FIGS. 1A-B) is secured between the mounting nut 600 and the mounting elbow 700. Elbow set screws 530 determine the torque required to rotate the signal-head out of proper street alignment. The wire conduit 20 routes sensor leads 220 and signal-head-related wires (not shown) to a control cabinet (also not shown). The control cabinet houses all of the command and control functions for the intersection and maintains communications with a central hub or DOT (Department of Transportation) control facility.

Figure 6A:
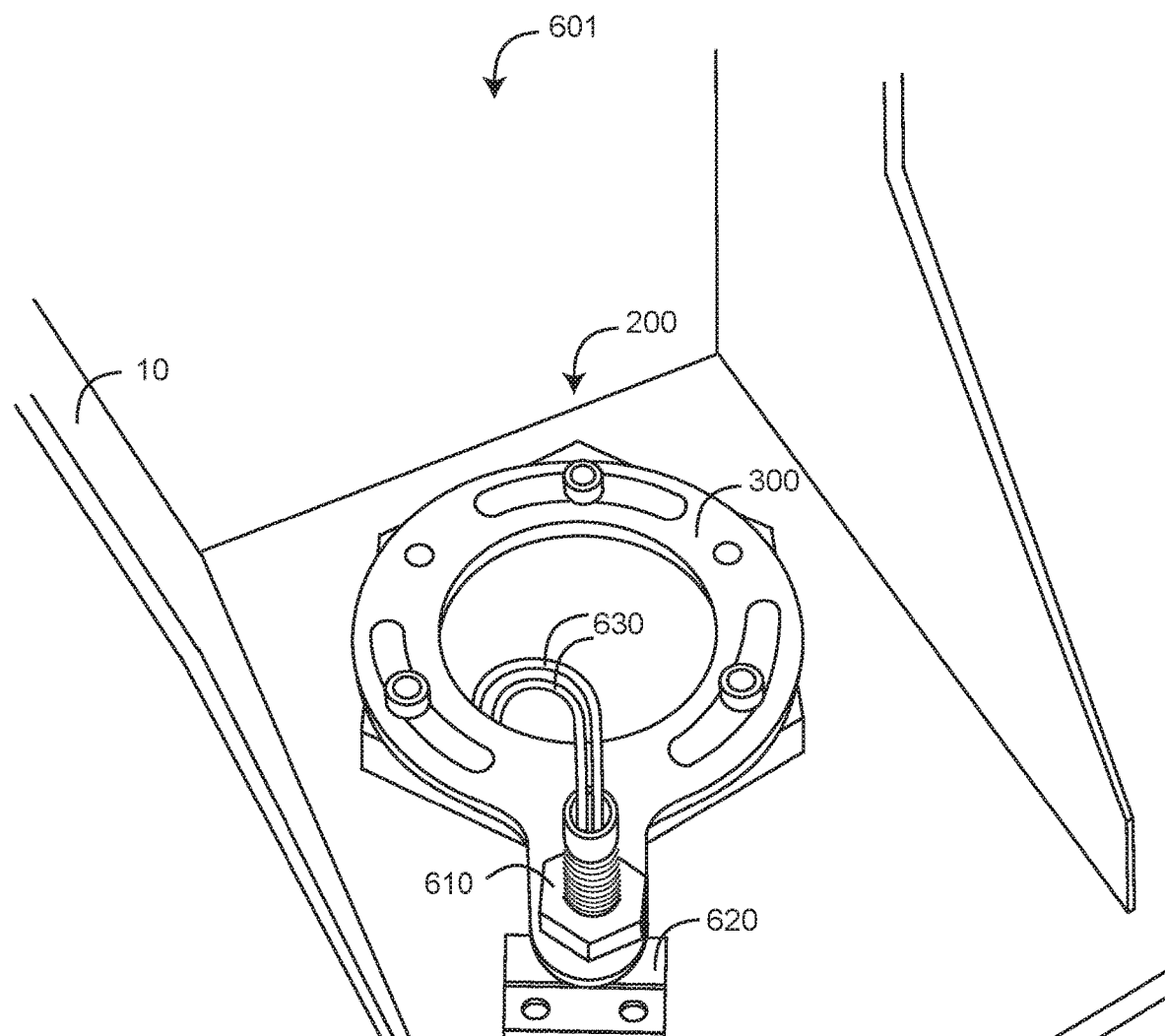
FIGS. 6A-B are perspective un-skewed and skewed views of a first traffic signal conflict detection embodiment having a magnet and a reed-switch sensor.
Figure 6B:
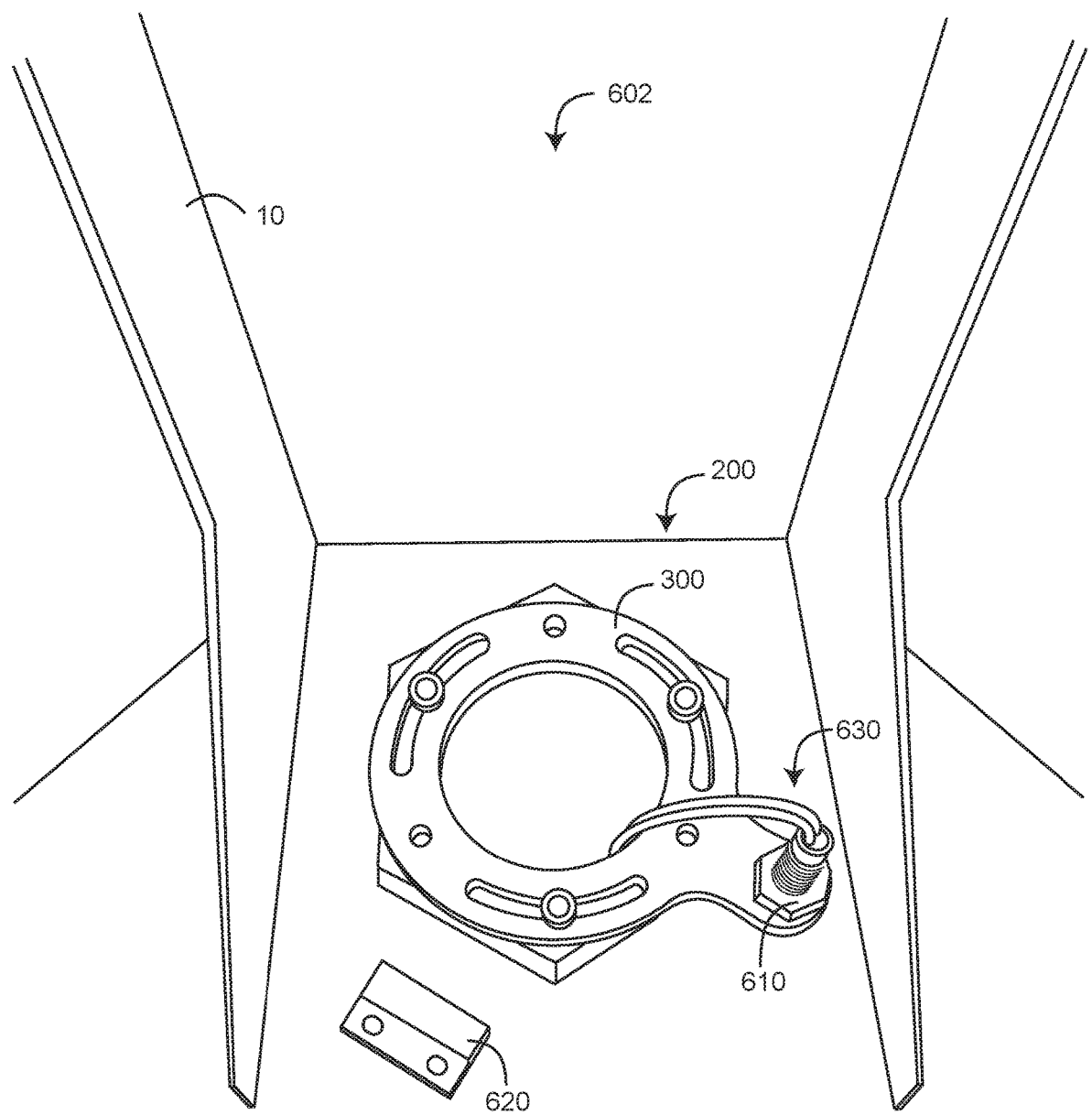

FIGS. 6A-B illustrate a first traffic signal conflict detection embodiment having a reed switch 610 and a magnet 620. The reed switch is disposed on a mounting plate 300. The magnet 620 is disposed on the signal head 10. In an embodiment, the reed switch 140 is normally-open. When disposed over the magnet 620 (FIG. 6A) the reed switch is closed. Current passing through the reed switch indicates an un-skewed 601 signal head 10. If the signal head 10 becomes skewed 102 (FIG. 6B) due to events like those described above, the magnet 620 rotates away from the reed switch 610, the reed switch returns to its normally-open position, current flow stops and a conflict is indicated accordingly.

Figure 7A:
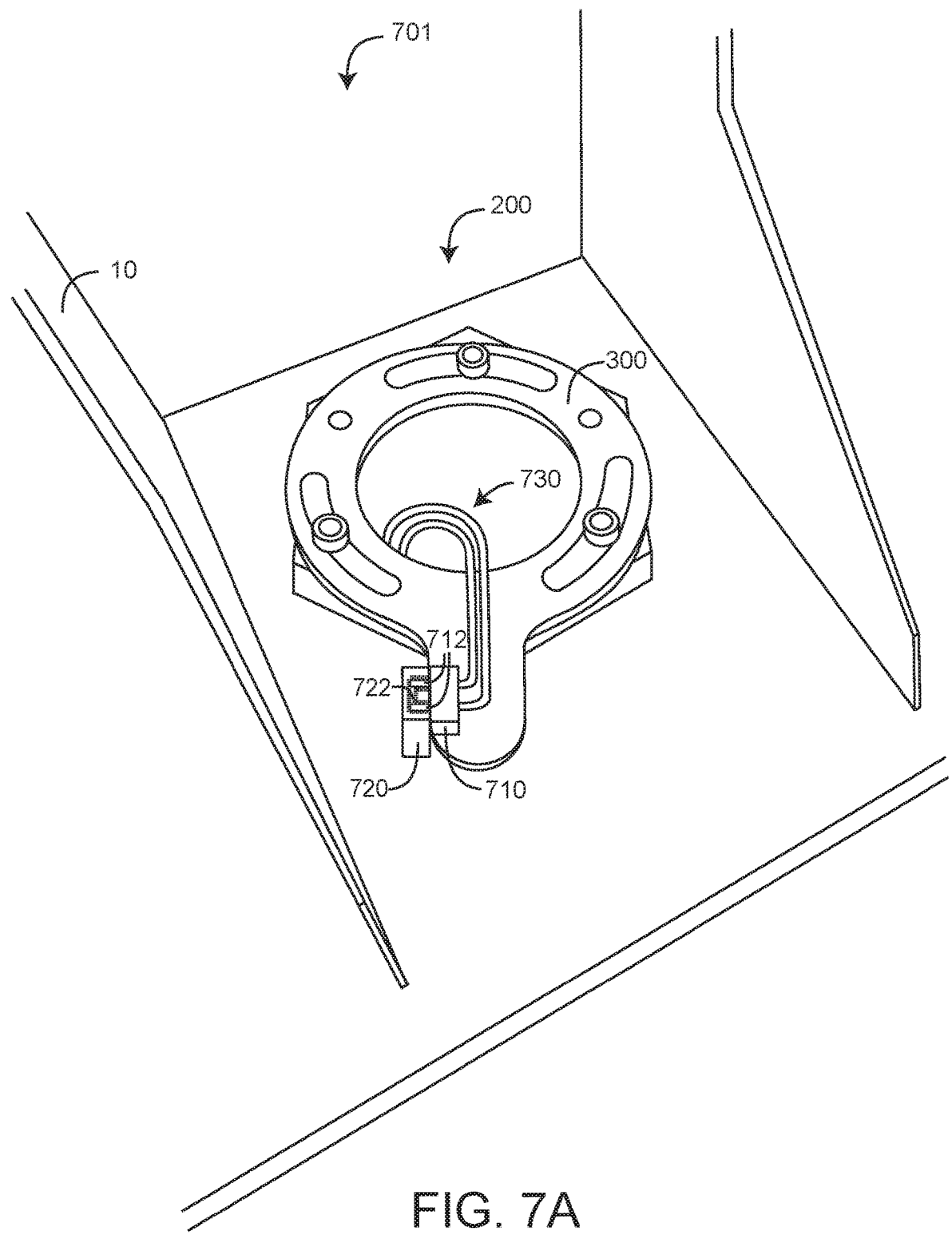
FIGS. 7A-B are perspective un-skewed and skewed views of a second traffic signal conflict detection embodiment having an optical sensor and an alternating light-dark printed arc.
Figure 7B:
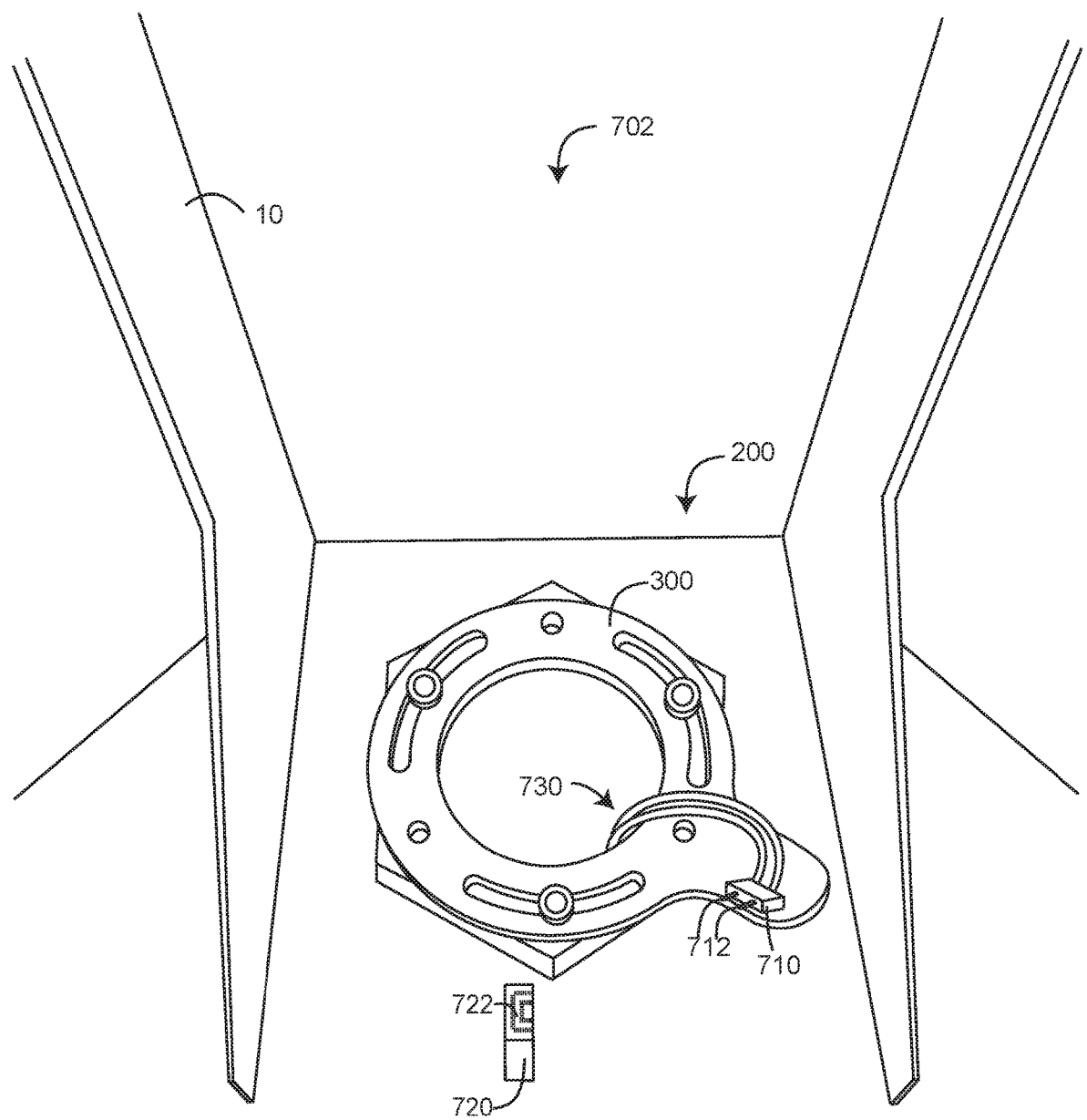

FIGS. 7A-B illustrate a second traffic signal conflict detection embodiment having a conductive plug 710 and a conductive link 720. As shown in FIG. 7A, when the conductive plug 710 is inserted in the conductive link 720 current flows through the wires 730 to the control cabinet cited above, indicating a no-conflict status. As shown in FIG. 7B, if the signal head 10 becomes skewed, the conductive link 720 rotates away from the conductive plug 710, current flow stops and a conflict is indicated accordingly.

Figure 8A:
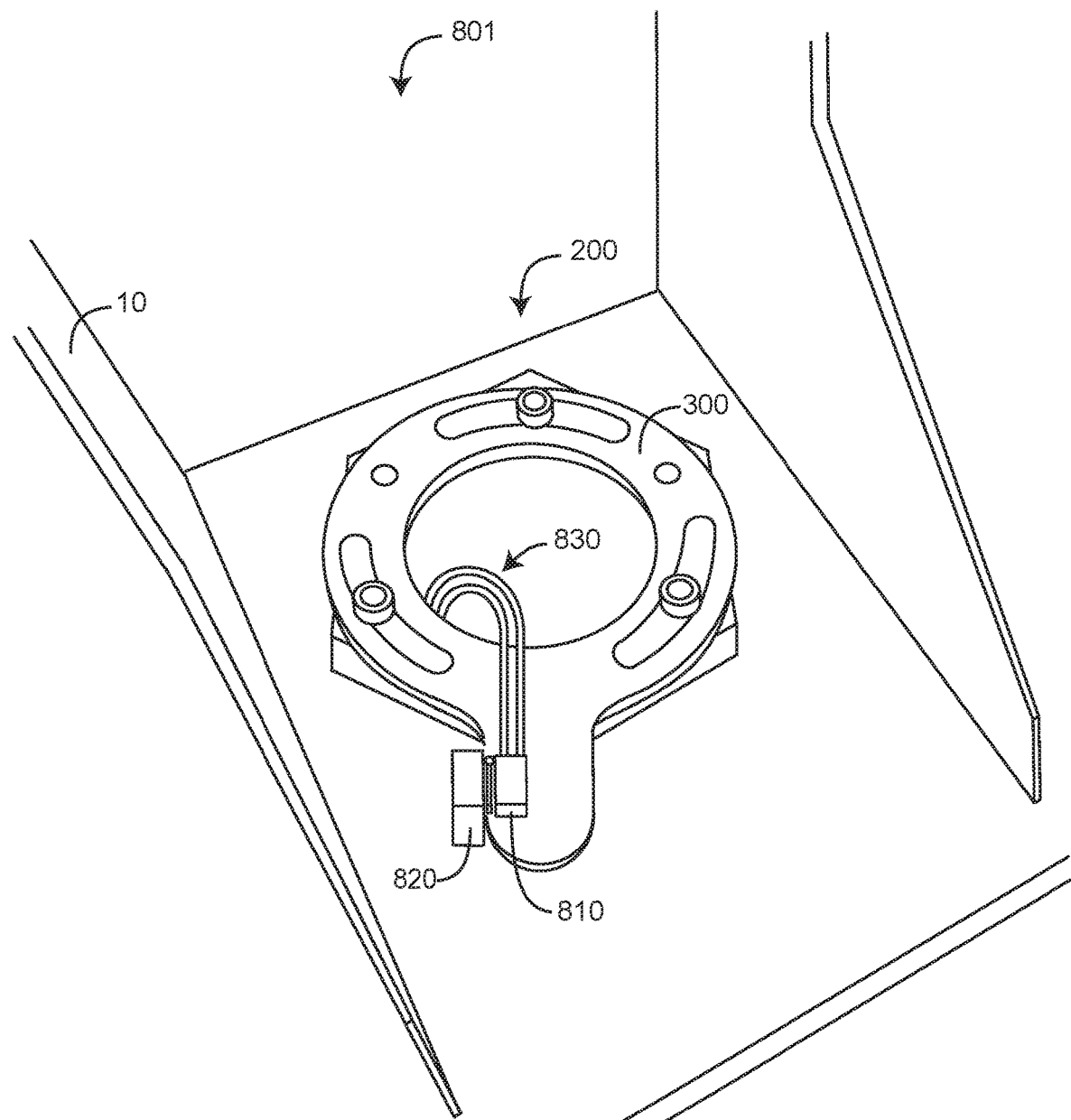
FIGS. 8A-B are perspective un-skewed and skewed views of a third traffic signal conflict detection embodiment having a plug and a conductive link.
Figure 8B:
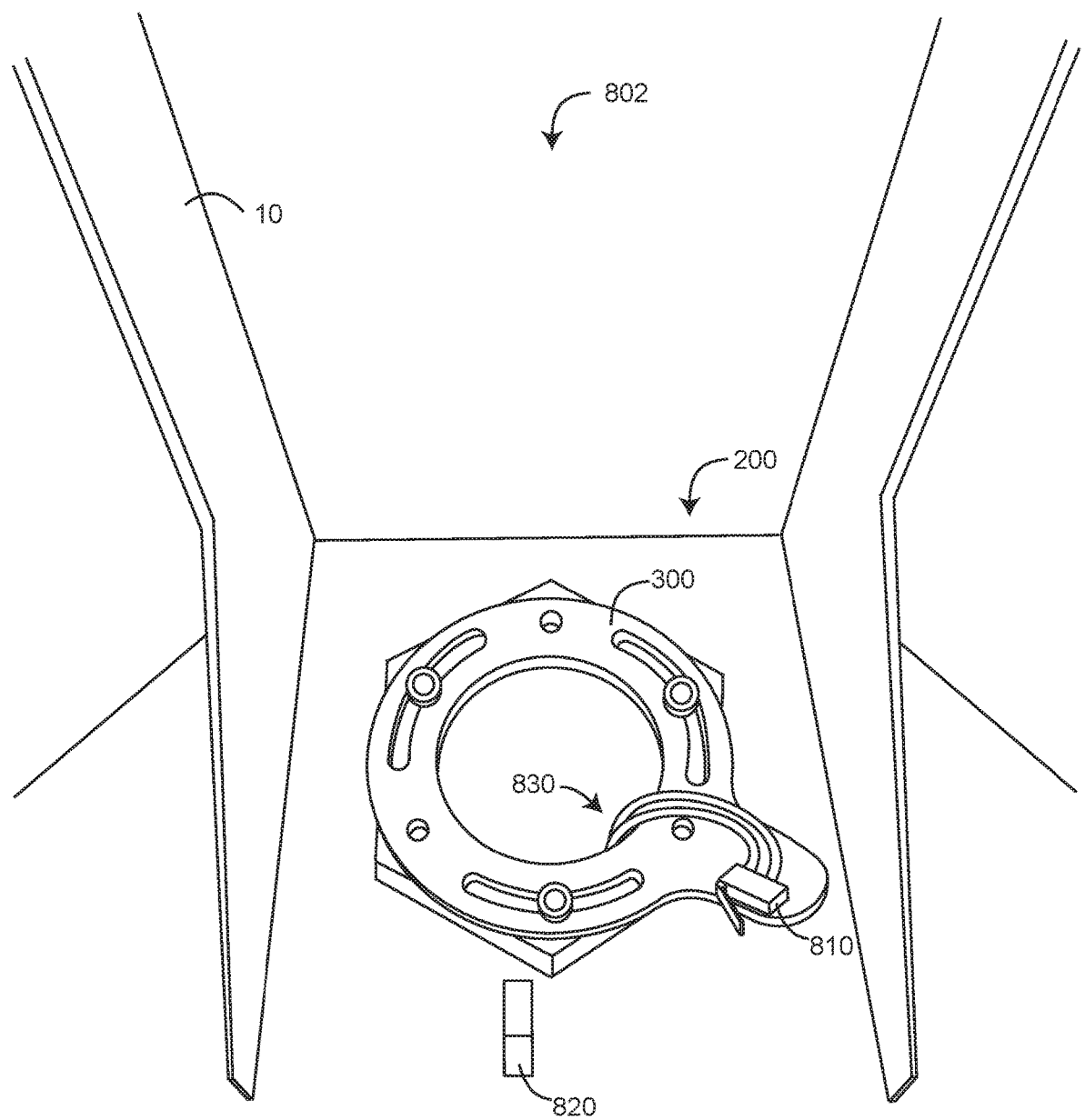

FIGS. 8A-B illustrate a third traffic signal conflict detection embodiment having a spring-load switch 810 attached to the mounting plate 300 and a fixed block 820 attached to the signal head 10. As shown in FIG. 8A, when the spring-loaded switch 810 is in a closed position pushing against the fixed block 820, current flows through the wires 830 to the control cabinet cited above, indicating a no-conflict status. As shown in FIG. 8B, if the signal head 10 becomes skewed, the fixed block 820 rotates away from the spring-loaded switch 810, allowing the switch to move to an open position, current flow through the switch 810 stops and a conflict is indicated accordingly.

Figure 9A:
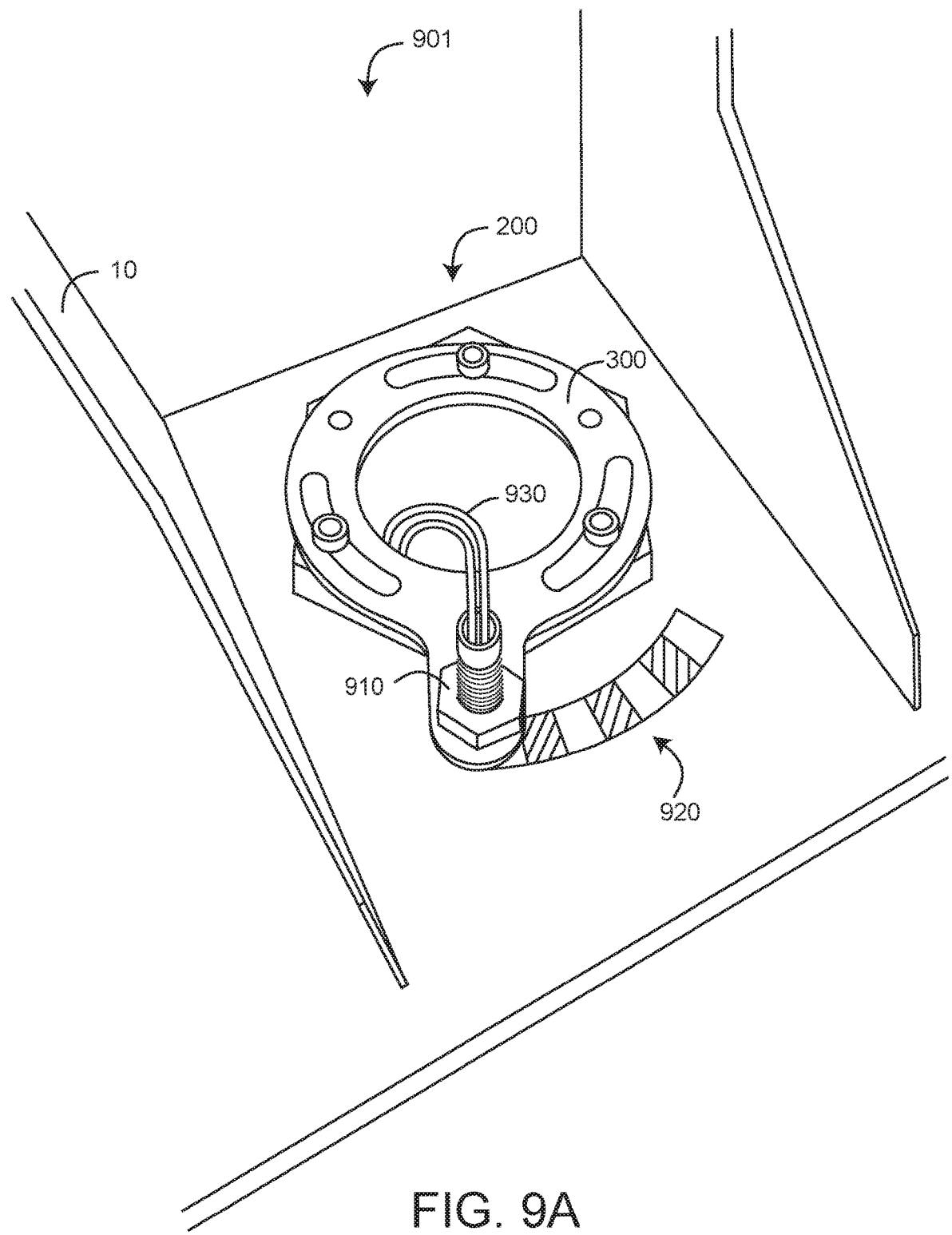
FIGS. 9A-B are perspective un-skewed and skewed views of a fourth traffic signal conflict detection embodiment having a fixed block and a switch.
Figure 9B:
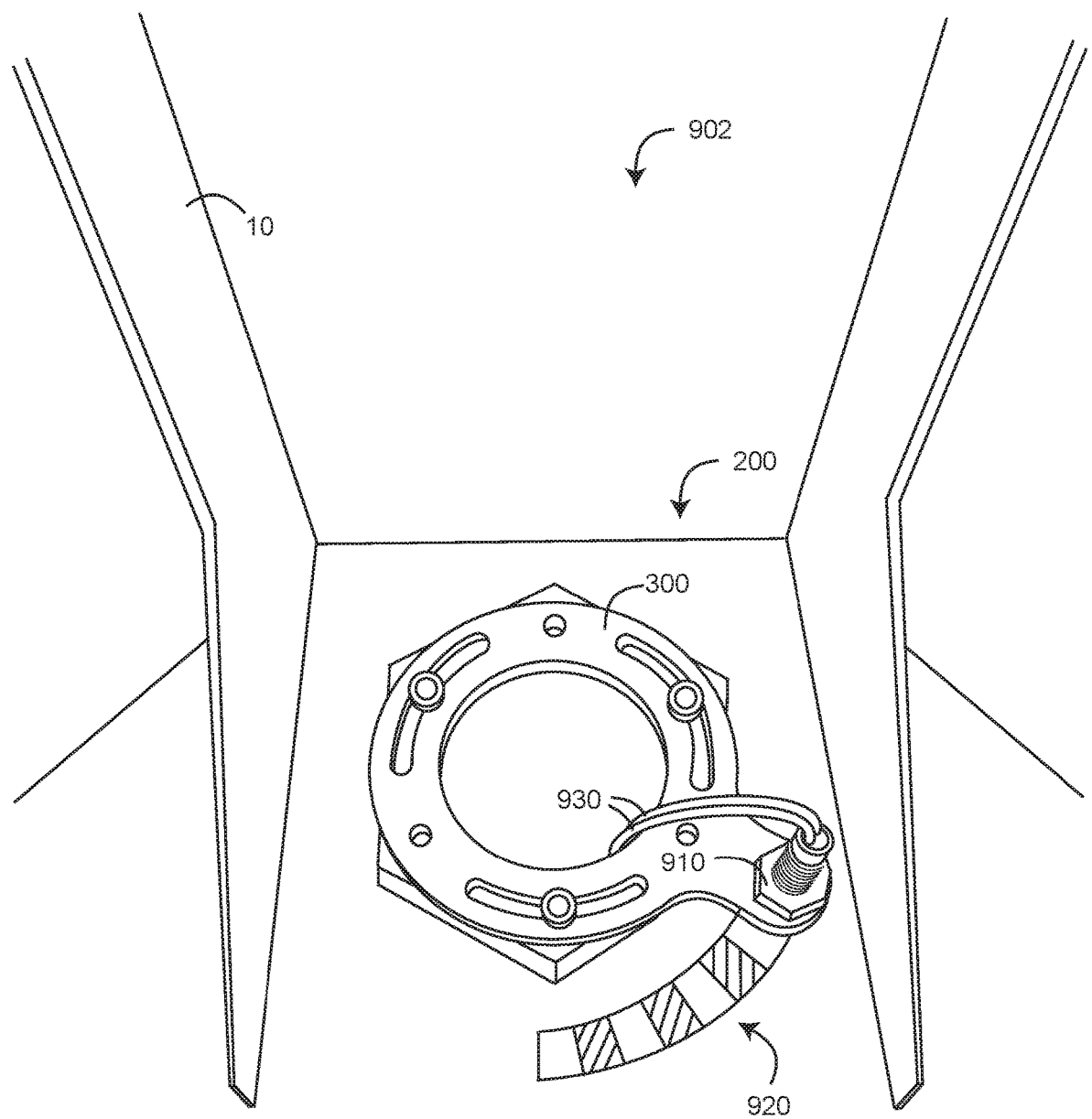

FIGS. 9A-B illustrate a fifth traffic signal conflict detection embodiment having a light source/optical sensor 910 disposed on the mounting plate 300 and an alternating light-dark arc printed on the signal head. FIG. 9A shows the signal head 10 is in a normal (no conflict) position. As the signal head 10 is disturbed by a traffic accident or other jarring event, the light source/optical sensor 910 moves across the alternating light-dark patches of the arc, resulting in a brief set of pulses transmitted to the control cabinet.

A traffic signal position detection system has been disclosed in detail in connection with various embodiments. These embodiments are disclosed by way of examples only and are not to limit the scope of the claims that follow. One of ordinary skill in the art will appreciate many variations and modifications.

What is claimed is:

1. A traffic signal position detector comprising:
    a traffic signal mount at least partially disposed within a signal head;
    a first sensor portion fixedly attached to the traffic signal mount;
    a second sensor portion fixedly attached to the signal head;
    the first sensor portion and the second sensor portion interact so as to indicate a traffic signal conflict; and
    a traffic signal position detector wherein a relative movement of the first sensor portion and the second sensor portion indicates a traffic signal conflict.

2. The traffic signal position detector according to claim 1 wherein the relative movement of the first sensor portion and the second sensor portion alters an electrical signal from at least one of the sensor portions.

3. The traffic signal position detector according to claim 2 wherein the relative movement of the first sensor portion and the second sensor portion ends the electrical signal from at least one of the sensor portions.

4. The traffic signal position detector according to claim 3 wherein the relative movement of the first sensor portion and the second sensor portion breaks a conductor connecting the first sensor portion and the second sensor portion.

5. The traffic signal position detector according to claim 3 wherein the relative movement of the first sensor portion and the second sensor portion actuates a switch to an open circuit position.

6. The traffic signal position detector according to claim 2 wherein the first sensor portion is an optical detector and the second sensor portion is an alternating light and dark pattern disposed along an arc on the signal head.

* * * * *